(No Model.)
J. A. SWASEY.
MANUFACTURE OF ABRADING POINTS FOR DENTAL AND OTHER USES.
No. 301,936. Patented July 15, 1884.
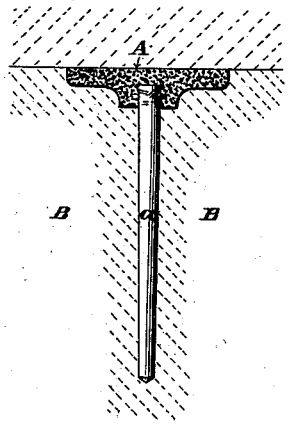
Attest:
Robert Burns
A. Campbell
Inventor:
James A. Swasey
per Smalley & Burns
Attorneys.

UNITED STATES PATENT OFFICE.

JAMES A. SWASEY, OF CHICAGO, ILLINOIS.

MANUFACTURE OF ABRADING-POINTS FOR DENTAL AND OTHER USES.

SPECIFICATION forming part of Letters Patent No. 301,936, dated July 15, 1884.

Application filed October 19, 1883. (No model.)

*To all whom it may concern:*

Be it known that I, JAMES A. SWASEY, a citizen of the United States, and a resident of Chicago, in the county of Cook and State of Illinois, have invented a new and useful Improvement in the Manufacture of Abrading-Points for Dental and other Uses; and I do hereby declare the following to be a full, clear, and exact description of the same, reference being had to the accompanying drawing, forming a part of this specification.

My invention relates to an improved mode of forming the small abrading points or heads employed in dental and other mechanical manipulation; and the objects of my improvement are to provide a cheap and ready means for the production of such points, and also to furnish a simple and effectual manner of attachment of the points to their carrying spindles or arbors.

The accompanying drawing illustrates the mode of carrying out my improved mode of manufacture.

My new and novel mode of forming abrading points, heads, &c., for dental and other uses, from corundum, emery, or analogous abrading substances, consists in supporting the carrying spindle or arbor $a$ within a suitably-shaped mold or die block, B, with an end or portion of the same projecting into the die or mold cavity, to enable the composition or body A of abrading and binding material to be pressed or compacted around it, as shown.

In order to assure a more certain attachment of the abrading body or composition, the projecting portion of the spindle or arbor may be roughened or formed with burrs or projections, as indicated in the drawing.

Any suitable plastic binding material for securing the abrading particles together may be used in my improved manufacture; but preference is given to rubber, celluloid, or shellac.

My improved mode of manufacture enables dentists and artisans to prepare their various shaped points as required with great convenience and dispatch by having a mold head or block provided with a series of different-shaped cavities, corresponding with the various shapes of abrading-points required in business.

Having thus fully described my invention, what I claim as new, and desire to secure by Letters Patent, is—

An improvement in the manufacture of abrading-points for dental and other uses, consisting in supporting the carrying spindle or arbor so that a portion of the same will project into the mold or die cavity, and then molding or pressing abrading composition into shape within such cavity, all essentially as herein shown and described.

In testimony whereof I have hereunto set my hand this 16th day of October, 1883.

JAMES A. SWASEY.

In presence of—
ROBERT BURNS,
H. D. SMALLEY.